United States Patent
Campbell

(10) Patent No.: US 8,649,412 B2
(45) Date of Patent: Feb. 11, 2014

(54) MOLECULAR GAS LASER

(76) Inventor: Robert Neil Campbell, Corrales, NM (US)

(*) Notice: Subject to any disclaimer, the term of this patent is extended or adjusted under 35 U.S.C. 154(b) by 33 days.

(21) Appl. No.: 13/135,221

(22) Filed: Jun. 29, 2011

(65) Prior Publication Data

US 2013/0003772 A1    Jan. 3, 2013

(51) Int. Cl.
  *H01S 3/22* (2006.01)
(52) U.S. Cl.
  USPC ............ 372/55; 372/25; 372/30; 372/69
(58) Field of Classification Search
  USPC ................................ 372/25, 30, 55
  See application file for complete search history.

(56) References Cited

U.S. PATENT DOCUMENTS 7,145,931 B2   12/2006   Krupke
7,286,574 B2 * 10/2007   Brasseur et al. ............ 372/4

OTHER PUBLICATIONS

J.H.S. Wang et al, CW Optical Resonance Transfer Lasers. Journal de Physique, Colloque C9, supplement au No. 11, Tome 41, 1980, C9-463.
J.H.S. Wang et al, CW Optically Resonance Pumped Transfer Laser in DF-CO2 System. Applied Physics Letters, 31(1), 1977, 35-37.
J. Finzi et al, CW HF/HCN and HF/DF Optical Resonance Transfer Lasers. IEEE Journal of Quantum Electronics, QE-16(9), 1980, 912-914.

* cited by examiner

*Primary Examiner* — Dung Nguyen

(57) ABSTRACT

The closed cycle solid state optically pumped gas hybrid (chemical recovery) system utilizes a laser diode excited solid state, fiber or bulk, laser as a pump for a molecular gas, or gas mix, medium. The existence of efficient high power laser diode excited solid state fiber or bulk lasers, output spectrally matched to suitable principle and excited level 1st and 2nd overtones of relevant gases, is the enabling system technology. The utilization of such in combination with suitable gases introduces a range of viable, in principle sourcing on laser diodes and thus effectively laser diode pumped, gas laser systems with access to the approximately 3.5 μm to approximately 5.2 μm and approximately 9 μm to approximately 11 μm spectral regions. Continuous wave or pulsed operation, with significant energy capability courtesy of solid state storage, is admitted.

13 Claims, 3 Drawing Sheets

Turn on response to CW principle and excited state 1st overtone pumps. Spectrally integrated output - 15 spectral components.

MOLECULAR GAS LASER

BACKGROUND OF INVENTION

1. Field of Invention

This invention relates to high power, infra-red lasers, more specifically, efficient laser diode excited solid state pumped molecular gas lasers and amplifiers.

2. Description of Prior Art

Mid-infrared vibrational-rotational transition lasers are well known. They are potentially very important as they have high power/high energy capability within critical atmospheric windows in the mid-wave infrared (MWIR) and long wave infrared (LWIR) spectral regions. These systems are typically energized using chemical interactions or electrical discharges. Chemically pumped systems are undesirable from the standpoint of the reactive precursors required, plus toxic exhaust product handling or release considerations. Electrical discharge pumped Carbon Monoxide (CO) lasers are less than successful as they generally emit at wavelengths greater than approximately 5.6 μm which is above the approximately 4.6 μm to approximately 5.4 μm atmospheric transmission window. There is a clear need to replace chemical or electrical discharge excitation of these devices.

U.S. Pat. No. 7,145,931 (Diode Pumped Alkali-Molecular Lasers and Amplifiers) describes optically-pumped mid-infrared vibrational-rotational transition gas lasers and amplifiers with improved efficiency and practicality, to wit, inventive lasers and amplifier devices include: laser active media comprising a mixture of alkali vapor, selected hetero-nuclear molecular gas, and one or more buffer gases; conventional semiconductor laser diode pump sources with nanometer scale spectral bandwidths; and preferential laser emission in rovibrational transitions among relatively low-lying vibrational levels.

This is a laser diode pumped resonant transfer approach and is deficient for a number of reasons. It is deficient in that it is not configured for direct and selected excitation of higher vibrational levels as this is a resonant transfer approach, as distinct from the concept proposed herein where multiple principle and excited state overtone pumps are applied [FIG. 1, A] in an intentional manner. This would have direct consequences in terms of the spectral diversity produced by the system which is directly related to the number of fundamental cascade (v→v−1 transitions—[FIG. 1, B]. v is the vibrational level quantum number designator) elements present in lasing. Furthermore, direct pump spectral location has an influence on cascade formed; that is, it exerts a degree of selection on content of the spectral output. The patent cited is deficient in that any dissociated halogen components derived from v⇆v exchange up pumping will scavenge alkali atomic vapor components via principally three body interactions eroding donor/acceptor gas mix balance. Recombined diatomic homonuclear halogens will react with alkali atomic vapor components as $M+X_2 \rightarrow X+MX$ (M is alkali vapor component—X is halogen). Alkali atomic vapor components have the ability to enter into $M+HX \rightarrow H+MX$, $M^*+HX \rightarrow H+MX$ and $M^*+HX^* \rightarrow H+MX$ (HX is acceptor component of U.S. Pat. No. 7,145,931—M is atomic vapor component—X is atomic halogen—* superscript denotes excitation, H is nominal, it may equally well be D) exchange interactions at operational temperatures concerned also eroding donor/acceptor gas mix balance. The latter issues clearly do not lend themselves to implementation of a closed cycle gas operating system free of precursor consumption or product handling. In addition, the system has to be conditioned for alkali vapor generation—typically in the range of 300K to 500K. It is deficient in that a laser diode pumped system of this nature lacks the ability to function in a pulsed significantly high power/high energy mode of operation as the system lacks lasing medium energy storage capability. This is also distinct from the invention presented here which admits a laser diode excited bulk pulsed Tm solid state driver and has the capability to store and deliver high energy pulses with extractions up to approximately 4 kJ/liter, plus closed cycle operation of gas component of system which, when in full cascade, merely functions as a throughput device with wavelength shift and output proportional to input in full cascade.

Additionally it has been asserted in the above cited patent (U.S. Pat. No. 7,145,931) that direct optical pumping of molecular transitions necessarily results in reduced performance from the pump source system because of the need to narrow the line width of these sources to match the line width of the molecular transitions concerned. Typically, for the gas system process presented herein, a rotational-vibrational line width will be in the range of approximately 0.5 GHz to approximately 2 GHz. This is equivalent to, for the pump concerned, approximately 0.007 nm to approximately 0.03 nm. Greater line widths are not excluded as they are a function of selected operating gas conditions which are not confined or restricted in any way by the identified typical line widths. However in general, such interaction line widths do traditionally diminish solid state laser performance courtesy of the limitations of cross relaxation. However, the cited patent's assertion is deficient as this problem is amenable to the following mitigating features particular to this invention: (a) The specific full to ground sustained lasing cascade process, in a suitable gas optically pumped, can only arise for pump pulse durations significantly greater than several to many times the rotational manifold thermalization time constant of the pumped gas, plus the duration associated with formative lasing onset supported level to level population redistribution supportive of creation of the conditions for sustainment of the full lasing cascade to ground. Typically this implies that optical pump durations greater than several hundred nanoseconds are required. Thus short pulse interactions are not suitable and not under consideration and thus the rapid cross relaxation in highly Tm doped YAG (Yttrium Aluminum Garnet), for example, in conjunction with its long excited state lifetime of approximately 10 ms will allow for efficient narrow band extraction. Similarly cross relaxation in Tm:glass, as in fibers, is also rapid at high dopant levels. Solid state Tm doped pulsed systems tend to produce, or can be configured to produce, pulse lengths in the range desired which is greater than several hundred nanoseconds to microseconds; a case with Ceramic Tm:YAG has recently been demonstrated, the implication of which is that arbitrarily configured and scaled highly doped amplifier structures can be fabricated. (b) In the case of continuous wave (CW) fiber pumps, the medium is characterized by an inhomogeneously broadened gain distribution. It is possible to amplify several spectrally separate wavelength components in such a medium provided that they are spectrally separated by the homogenous line width of the molecular subgroup (sometimes described as the mode repulsion range)—thus enabling useful enhancement of the effective interaction bandwidth and thus enhancement of solid state system performance. This fact has natural synergism with the principle plus multi excited state overtone or multi principle overtone (differing rotational vibrational transitions) gas pump feature of the invention presented here. To a degree this behavior would also manifest for pulsed Tm:YAG, or YAP, YSGG or any other suitable solid state host, as system is quasi 4 level with different wavelengths between differing Stark components of the energy level structure and in response, inhomogeneously broadened.

This approach is also deficient, in regards of output spectral range accessible and thus for specific applications, in terms of the fact that resonant transfer systems in general (and as stated in the abstract (Krupke: U.S. Pat. No. 7,145,931)) offer preferential laser emission in ro-vibrational transitions among relatively low-lying vibrational levels. This as indicated will limit the spectral diversity achievable by pumping of higher vibrational levels which is directly addressable and may be intentionally tailored within the context of the invention presented here.

The article, CW Optical Resonance Transfer Lasers. [J. H. S. Wang et al, Journal de Physique, Colloque C9, supplement au n°11, Tome 41, 1980, C9-463] describes wavelength-agile, single and multiline laser radiation that has been obtained from a subsonic gas flow system which is optically pumped with a multiline chemical laser. This optical resonance transfer laser (ORTL) concept was first demonstrated on the 10.6 μm DF/$CO_2$ system in 1976. Since then, several infrared (IR) laser pumped molecular lasers have been demonstrated. The pump laser is either a CW (Continuous Wave) HF or DF chemical laser. Two classes of ORTL have been developed: inter- and intramolecular ORTLs. The demonstrated intermolecular systems include: 10.6 μm DF/$CO_2$, 10.8 μm DF/$N_2O$, 4.1 μm DF/HBr, 3.8 μm HF/DF and 3.85 μm HF/HCN. The intramolecular ORTLs include 2.9 μm HF/HF and 3.9 μm DF/DF. Demonstration experiments and the kinetics of ORTL systems will be described.

This was a fundamental cascade optically pumped followed by a fundamental cascade lasing response system. The approach of this article is deficient as there is no practical value to optically pumping HF with another HF laser. That is, there is no useful wavelength shift induced between pump input and output. The approach of this article is also deficient in that the pump chemical HF laser system utilized is impractical. Chemical lasers although in general efficient require exhaust product plus precursor fuel and oxidizer handling. If purely cold reaction discharge initiated by dissociation of halogen donor, then are typically inefficient plus still require product gas handling and high voltage.

The article, CW Optically Resonance Pumped Transfer Laser in DF-$CO_2$ System [J. H. S. Wang et al, Applied Physics Letters, 31(1), 1977, 35-37] describes an optically pumped CW 10.6 μm DF/$CO_2$ transfer laser that has been demonstrated. This has been accomplished by exciting a 3 cm×0.3 cm transfer laser medium, consisting of a 1:19:80 DF/$CO_2$/He flowing gas mixture at 22 Torr and room temperature, with a 70 Watt multiline chemical DF laser. In the preferred 'intracavity' configuration where the transfer-laser medium was located in between the DF-laser resonator mirrors, 1.5 W of 10.6 μm power was out coupled. This power corresponds to a photon conversion efficiency of available DF-pump flux to out coupled transfer-laser flux of 6%. Analysis predicts that multiline DF laser-to-single-line $CO_2$ photon conversion efficiencies exceeding 90% should be attainable in an optimized apparatus configuration.

This approach is deficient in that the pump laser is impractical. Chemical lasers although in general efficient require exhaust product plus precursor fuel and oxidizer handling. If purely cold reaction discharge initiated by dissociation of halogen donor, then are typically inefficient plus still require product gas handling and high voltage.

The article CW HF/HCN and HF/DF Optical Resonance Transfer Lasers [J. Finzi et al, IEEE Journal of Quantum Electronics, QE-16(9), 1980, 912-914] describes that CW laser oscillation has been observed in HCN at 3.85-3.9 μm and in DF at 3.8-4.0 μm. Mixtures of HF/HCN/He and HF/DF/He were irradiated by a CW multiline HF chemical laser. Vibrational excitation of HF by resonance absorption, followed by rapid v-v energy transfer to HCN or DF, produced a population inversion. The HCN gain was estimated to be between 0.08 and 0.17 percent/cm. The DF gain was greater than 0.17 percent/cm and 25 mW of power were out coupled.

This approach is deficient in that the pump laser is impractical. Chemical lasers although in general efficient require exhaust product plus precursor fuel and oxidizer handling. If purely cold reaction discharge initiated by dissociation of halogen donor, then are typically inefficient plus still require product gas handling and high voltage.

SUMMARY OF THE INVENTION

It is the object of the present invention to provide for an efficient, at system electrical interface, laser diode excited Continuous Wave (CW) or quasi CW and pulsed energy capable, highly multispectral MWIR to LWIR laser system overcoming the shortcomings of prior art devices. The invention presented here is to use the synergism inherent in the recent development of efficient high power/high energy laser diode pumped Thulium (Tm), or Erbium (Er), doped solid state lasers and the matching of said systems useful spectral range with $1^{st}$ (principle and excited state [FIG. 1, A], or multiple principle), or $2^{nd}$, overtone transitions of suitable relevant gases. Several spectrally discrete pumps on distinct transitions of a specific overtone are also possible [analogous with pump on [FIG. 4, A]]. Melded with a gas component and implemented appropriately this has the ability to initiate a sustained fundamental transition lasing cascade from near the highest vibrational level excited by the pump geometry selected to the molecular ground vibrational level. The issue of pump driven dissociation, where applicable, is addressed by appropriate biasing of system operating gas mix to favor hot reaction reconstitution to an excited state of the active gas mix component. The latter resulting in a closed cycle chemically related photonic energy contribution to the fundamental transition lasing process. Globally a closed cycle gas operating system is engendered wherein the optically pumped gas mix recovery is to essentially preset conditions without any requirement for precursor or product gas handling. In the case of active gas components with permanent and significant dipole moments far infra red amplified spontaneous emission may be leveraged to minimize thermal shedding in gas when appropriately configured.

This system is absent primary chemical or discharge pumping, and is then absent the related fuel or exhaust product gas handling issues. Spectral agility is inherent in rotational manifold relaxation rates admitting efficient channeling of broadly multispectral output into desired atmospheric windows, or of output into atmospheric windows, or indeed into a near single frequency output comprised of multiple fundamental-transition cascade elements within atmospheric windows.

Implementation of multiple overtone pumps enhances interaction bandwidth with laser diode pumped solid state source (Tm or Er doped—any suitable solid state host) and thus optimizes efficiency of that system component, and thus of system globally.

Implementation of multiple, principle plus excited state, overtone pumps will permit selection of long wavelength edge of fundamental cascade output spectral range. Implementation of overtone pumps ensures a useful pump to output wavelength shift.

BRIEF DESCRIPTION OF THE DRAWINGS

The accompanying drawings, which are incorporated into and form a part of the disclosure, illustrate embodiments of the invention, and together with the description, serve to explain the principles of the invention.

FIG. 4: Multiple principle overtone pumps in this case (A). Multiple pumps spectrally discrete and such that they constitute an adequate bandwidth for effective laser diode pumped solid state system interaction and thus efficiency. Optical pump of gas may be CW, quasi CW or pulsed and thus solid state source system may be CW, quasi CW or pulsed. Specifically, the multiple pumps are spectrally discrete to the extent that no component is within the mode repulsion range of any other component. Low energy defect between $H^{13}CN$ (donor), or identically $H^{12}CN$, and CO (acceptor) results in rapid (B) near resonant excitation transfer to the CO molecule (C). Subsequent cascade lasing of CO molecule (D). HI to CO donor acceptor plus pump functional arrangement would be similar.

DETAILED DESCRIPTION OF INVENTION

Definition of Deactivant or de-activant: a molecule or atom which may or may not efficiently serve to accept or dissipate excitation from another excited molecule, thus deactivating said molecule.

Figure 4:
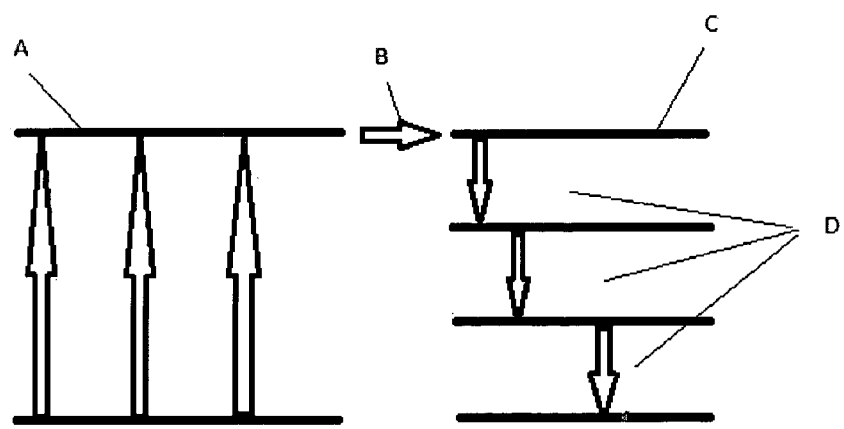

The invention presented here is to use the synergism inherent in the recent development of efficient high power/high energy laser diode pumped Thulium (Tm) doped solid state lasers and the matching of said systems useful spectral range with $1^{st}$ (principle and excited state [FIG. 1, A], or multiple principle), overtone transitions of suitable relevant gases. Several spectrally discrete pumps on distinct transitions of a specific overtone are also possible [analogous with pump on [FIG. 4, A]—distinct rotational vibrational transitions].

This multi spectral pump approach implemented as indicated usefully broadens the interaction bandwidth experienced by the solid state pump sources significantly above that of the typical single frequency narrow band matched to a single molecular transition approach, optimizing the efficiency of the laser diode pumped solid state pump component of the system.

In addition, the identified methodology leverages a behavior characteristic of said gases, admitting a full sustained fundamental transition lasing cascade from more or less pump terminal level to ground ($v \rightarrow v-1 \rightarrow v-2$ and so on [FIG. 1, B]) when overtone pumped, or cascade overtone pumped. This arising under appropriate pumping conditions and admitting broadly multispectral output. Principle denotes out of ground pump overtone transition ($0 \rightarrow 2$ for example, [FIG. 1, A]), excited state denotes an overtone pump transition originating out of any excited vibrational level ($v \rightarrow v+2$, [FIG. 1, A]).

Relevant gases are HCl, DF, HBr and by association $CO_2$ if desired. $CO_2$ is pumped via resonant transfer as per: $HBr^* + CO_2 \rightarrow HBr + CO_2^*$ —reactions such as $HCl^* + CO_2 \rightarrow HCl + CO_2^*$ and $DF^* + CO_2 \rightarrow DF + CO_2^*$ represent the preferred embodiments of the resonant transfer methodology as the transition energy defect is minimized at high vibrational quantum number resulting in quenching of collisional mediated vibrational up pumping of donor species. The * superscript denotes excitation. The optically pumped molecular components are by definition donors, and the molecular components excited by resonant transfer from the donor components are acceptors.

Solid state Er doped (Yb co-doped, as required, or other codopant) system spectral output overlays overtone transitions of other relevant gases. Said relevant gases are HI ($2^{nd}$ overtone) and HCN ($00^0 \rightarrow 00^0 2$—a $1^{ST}$ overtone). HI and HCN will also function as donors in resonant transfer arrangements with CO. That is to say: $H^{13}CN^* + CO \rightarrow H^{13}CN + CO^*$ and identically $H^{12}CN^* + CO \rightarrow H^{12}CN + CO^*$ or $HI^* + CO \rightarrow HI + CO^*$ in both cases of which the defect is less than or equal to background thermal kT.

In the case of resonant transfer systems spectral output may derive from both species—directly pumped donor and acceptor as determined by the component partial pressures and pump conditions.

Buffer gas components such as He, Argon, $H_2$, $N_2$ to be implemented as required.

In the case of hydrogen halide/deuterium halide, presence, the gas component would be biased with the related molecular halogen to yield chemical system energy recovery from up pumping driven dissociation plus closed cycle gas function. Closed cycle gas function, as understood here, specifically denotes the preservation of gas mix features, as recovery is to the initial specification, within some small acceptable variance. Molecular halogens are ineffective excitation deactivants and thus are tolerable at a significant partial pressure presence in system gas mix, which favors hot reaction scavenging of atomic hydrogen or deuterium halide dissociation products via reactions of the form: $H + X_2 \rightarrow X + HX^*$, which contribute to lasing and thus represent systemic recovery of useful energy. Utilization of H is merely for purposes of example, D is equally valid. Activation energies for the $H+X_2 \rightarrow X+HX^*$ reactions are modest, resulting in favorable rates. Thus the optically pumped dissociation/recovery process is ultimately closed cycle as: M+HX (dissociation band)+$X_2 \rightarrow$M+X+H+$X_2 \rightarrow$M+2X+HX*$\rightarrow$M+$X_2$+HX+ (lasing cascade photons) (M=generally any molecular or atomic collision partner). To reiterate, closed cycle gas function denotes specifically that the gas specifications, post recovery, are the same as initial specifications within some small acceptable variance. Equivalently a $H_2$ ($D_2$) gas bias would also be supportive of closed cycle gas function.

Atomic halogen recombination rates (3 body process typically) thus represents the gas mix recovery systemic limiting factor. Simply operate system pulsed or quasi CW with adequate inter event timescale for recovery, alternatively implement gas flow.

Figure 1:
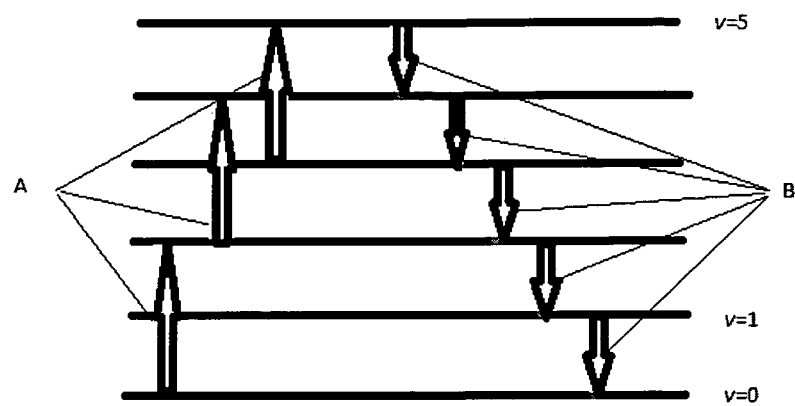
FIG. 1: Multiple principle and excited state overtone pump concept (A). This broadens useful bandwidth of interaction with the laser diode pumped solid state component of system, subject to the condition that the spectral separation between contributory pump components exceeds the mode repulsion range of the medium, enhancing said systems performance. Fundamental ground return lasing cascade follows for medium appropriately located in a suitably broadband resonator (B).
Figure 5:
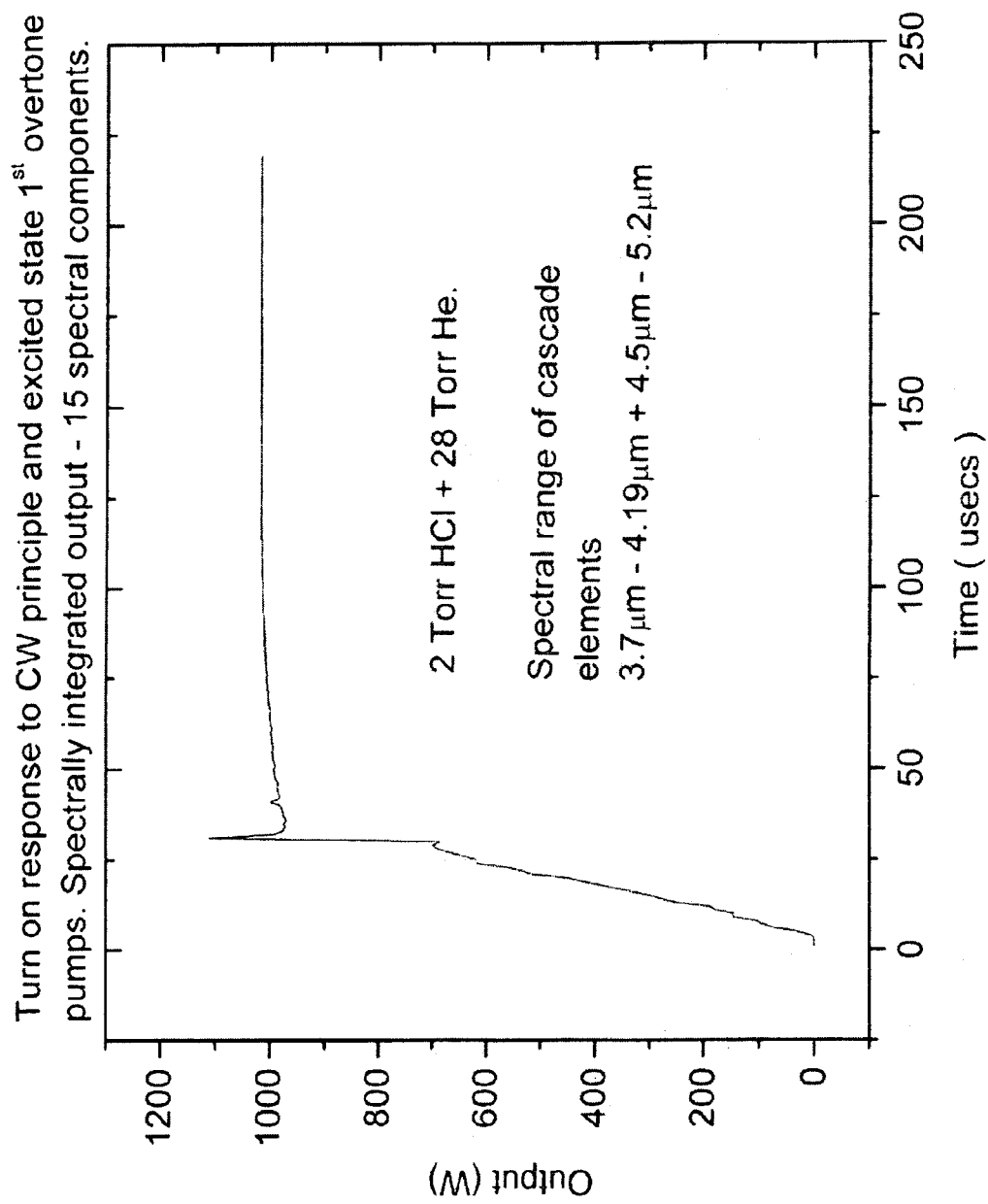
FIG. 5: Example of projected Quasi CW behavior in HCl driven into full cascade by a principle and excited state overtone pump configuration. Conversion efficiency of this element approximately 87% (output power to absorbed power). Optical pump absorbed approximately 1200 W.

At the simplest possible gas process level, with HCl as an example, HCl is optically pumped on a principle $1^{st}$ overtone–v(0$\rightarrow$2), plus several subsequent excited state $1^{st}$ overtones such as v(1$\rightarrow$3), v(3$\rightarrow$5) and so on to the extent desired or possible [FIG. 1, A]. Several spectrally discrete pumps on distinct transitions of a specific overtone are also possible [analogous with pump on [FIG. 4, A]]. For adequate drive fluence or irradiance the gas medium is driven into a saturation condition level to level supportive of positive fundamental transition gain and cascade lasing to ground (v$\rightarrow$v–1$\rightarrow$v–2 and so on). This is an inherently effective process offering high quantum efficiency with spectral agility as a result of rapid population redistribution within the rotational manifolds. FIG. 5 represents a projection of such behavior to the multiple overtone pump fundamental cascade lasing scheme of a gas.

As indicated a contributory component to enabling this approach is the recent appearance of highly efficient high power laser diode pumped Tm, or Er, doped solid state systems. Tuning spectral range of Tm solid state laser systems extends from approximately 1.74 µm to approximately 2.017 µm. Correspondence of this spectral range with $1^{st}$ overtone transitions, principle and excited state, of HCl, DF and HBr is good. In the case of Er (perhaps Yb co-doped) matching with HCN and HI $1^{st}$ and $2^{nd}$ overtones respectively is equally good.

The $H^{13}CN$ isotopologue is of particular interest courtesy of its facility for near resonant transfer to CO. HI presents with similar capability, although a full fundamental cascade to ground process, lasing potential in vicinity of approximately 4.7 µm to approximately 5.2 µm of this molecule is also viable and of interest. Exchange reactions between CO and HCN, HI or $I_2$ in mixes are improbable.

This general approach results in what effectively is a laser diode initiated/sustained/pumped efficient high power access to the MWIR and LWIR spectral regions via the identified hetero-nuclear and triatomic molecules identified. The highly efficient Tm doped solid state bulk or fiber laser (or Er doped solid state) is the molecular pump source. This approach is enabled by leveraging cascaded overtone pumping (or multiple principle overtone pumping on related rotational vibrational transitions, or multiple principle and multiple excited state) of gas to produce a useful Stokes shifted output in a fundamental transition cascade to ground (FIG. 5, FIG. 1). The fundamental ground return cascade onset and maintenance is dependent on the achievement, or better, of specific threshold optical pump conditions for the molecular gas concerned. The resultant molecular output may be broadly multispectral or near single frequency. The pump geometry implemented has a direct bearing on the selection of the long wavelength edge of the fundamental cascade output spectral range produced. The corresponding existence of matching, spectrally to identified gases, laser diode excited solid state pumping technology from which extraction is optimized by the cascade pump enabled bandwidth enhancement attributable to the methodology presented, and the introduction of chemical photonic recovery from dissociation products with associated closed cycle gas mix operation, results in a flexible and sensible system.

For efficient full cascade lasing operation from a pump transitions terminal to its ground level [FIG. 1, A,B], the pump fluence or irradiance must be such as to override gas vibrational and other loss processes sufficiently, with events of sufficient temporal extent, to induce the requisite pump transition saturation for vibrational levels which are essentially rotationally thermalized and positive gain for the fundamental transitions, in a lasing cascade to ground. Ground is by definition molecular ground when a pump transition sources on molecular ground, or it may be a vibrationally excited level populated by an existing optical pump transition as in FIGS. 1, A,B. Then it is the ground level of the excited state pump concerned. An excited vibrational level sourced pump transition and full cascade lasing process may thus also source off an excited vibrational level.

At the gas component level, overtone transition cross sections generally increase with source level vibrational quantum number which facilitates the effectiveness of pump coupling with diminishing excited level populations. Similarly, in general, fundamental transition cross sections increase with increasing vibrational quantum number to some point aiding formation of lasing cascade The following is a description of the best mode contemplated by the inventor of the laser diode excited, that is pumped, solid state optically pumped molecular laser with chemical reaction recovery system. A laser diode excited, that is pumped, Tm doped, solid state CW laser, comprised of seed fiber oscillators tuned and locked onto principle and excited state overtone frequencies of gas. Solid state laser element in principle an oscillator amplifier configuration, amplifier amplifying one or more distinct frequencies with spectral beam combination prior to amplifier. Distinct frequencies selected with due consideration to medium mode repulsion range. Amplifier optical output coupled as input into the gas component region and matched to the volume of the related cavity or waveguide mode. In coupling accomplished by spectral beam combination (a significant wavelength difference exists between pump and gas component output), dichroic optics or any other means. Gas mix as required plus bias for chemical reaction recovery. Refer to [FIG. 3, A, B, C, D].

The following is a description of an alternative embodiment contemplated by the inventor of the laser diode excited, that is pumped, solid state optically pumped molecular laser with chemical reaction recovery system. A laser diode excited, that is pumped, Tm doped, solid state pulsed laser, comprised of seed oscillators tuned and locked onto principle and excited state overtone frequencies of gas. Solid state laser element in principle an oscillator amplifier configuration, amplifier amplifying one or more distinct frequencies with spectral beam combination prior to amplifier. Distinct frequencies selected with due consideration to medium mode repulsion range. Oscillator optical outputs temporally synchronized. Amplifier optical output coupled as input into the gas component region and matched to the volume of the related cavity or waveguide mode. In coupling accomplished by spectral beam combination (a significant wavelength difference exists between pump and gas component output), dichroic optics or any other means. Gas mix as required plus bias for chemical reaction recovery. Refer to [FIG. 2, A, B, C, D].

The following is a description of an alternative embodiment contemplated by the inventor of the laser diode excited, that is pumped, solid state optically pumped molecular laser with chemical reaction recovery system. A laser diode excited, that is pumped, Tm doped, solid state quasi CW laser, comprised of seed fiber oscillators tuned and locked onto principle and excited state overtone frequencies of gas. Solid state laser element in principle an oscillator amplifier configuration, amplifier amplifying one or more distinct frequencies with spectral beam combination prior to amplifier. Distinct frequencies selected with due consideration to medium mode repulsion range. Oscillator optical outputs temporally synchronized. Amplifier optical output coupled as input into the gas component region and matched to the volume of the related cavity or waveguide mode. In coupling accomplished by spectral beam combination (a significant wavelength difference exists between pump and gas component output), dichroic optics or any other means. Gas mix as required plus bias for chemical reaction recovery. Refer to [FIG. 3, A, B, C, D].

As a system feature, if laser diode excited solid state component of system is pulsed or quasi CW, then said system must be such that resultant event durations are of sufficient temporal extent and in gas hybrid component fluence (or irradiance) is sufficient to attain or exceed the required gas pump saturation condition consistent with establishment of positive gain on all fundamental lasing transitions to ground. That is temporal extent must be significantly greater than gas rotational manifold thermalization times and any level to level (level to level cascade lasing onset aided) population formative times at least.

As a system feature, if laser diode excited solid state component of system is CW, then said system must be such that resultant in gas element irradiance must be in excess of a threshold condition, related to the maintenance of a pump transition saturation condition, associated with positive gain on all fundamental lasing transitions to ground.

Figure 2:
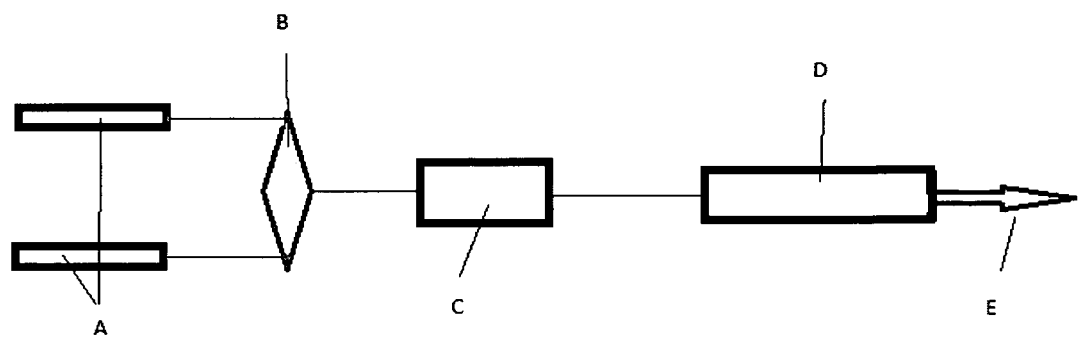
FIG. 2: One or more temporally synchronized laser diode pumped solid state laser oscillators, spectrally discrete and with individual component to individual component spectral separation in excess of amplifier medium mode repulsion range but individually locked onto desired principle and excited state overtone pump transitions (A). Spectrally combined (B) they provide for adequately broadband interaction with laser diode pumped solid state amplifier to yield enhanced efficiency on introduction to amplifier (C). Amplifier optical output introduced into gas component resonant cavity in a manner to optimize matching between pumped volume and cavity defined lasing mode volume (D). Gas component plus related optical resonant cavity of system as identified here is alternatively defined to be the gas hybrid component of the entire system. Gas component lasing output (E).
Figure 3:
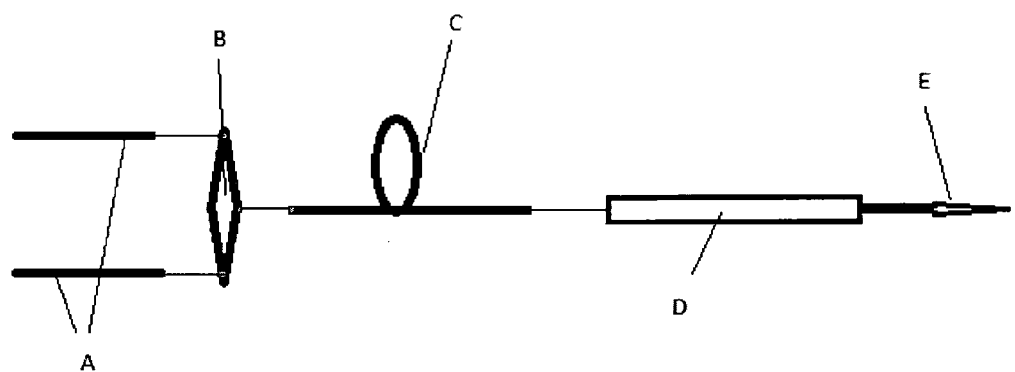
FIG. 3: Functionally identical to FIG. 2, but with fiber as opposed to bulk systems. D designates the gas component plus related optical resonant cavity of system or as by previously established convention the gas hybrid component of the entire system.

As a system feature, a gas component (cell) with suitable broadband cavity resonator optics to access desired range of excited fundamental cascade transitions of optically pumped gas is required [FIG. 2, D; FIG. 3, D].

As a system feature a gas cell of material inert to gas components, or subject to prior chemical passivation [FIG. 2, D; FIG. 3, D], is required. Gas fill of optical pump gas species of interest (HCl, HBr, DF or HI), plus one or more of He, $H_2$, Argon and $X_2$ (molecular halogen component with X=Cl, Br, F or I). Halogen component biased to favor atomic $H+X_2 \rightarrow HX^*+X$ or $D+X_2 \rightarrow DX^*+X$ hot scavenging reactions.

As a system feature, a gas cell of material inert to gas components, or subject to prior chemical passivation [FIG. 2, D; FIG. 3, D], is required. Gas fill of donor/acceptor species mix of interest (HBr+$CO_2$, HCl+$CO_2$, DF+$CO_2$, $H^{13}CN$+CO, $H^{12}CN$+CO or HI+CO), plus one or more of Argon, He, $N_2$, $H_2$, $D_2$, $Br_2$, $Cl_2$, $F_2$ or $I_2$ to the extent required.

As a system feature, a gas fill pressure and mix selected to optimize pump coupling, minimize full sustained cascade onset pump irradiance threshold (requisite driven saturation condition).

As a system feature, a gas cell with windows of inert materials of adequate spectral transmission range, bulk absorption and thermal conductivity for system duty cycle selected.

As a system feature, if solid state pump system pulsed or quasi CW, laser pulse full width at half maximum at least greater or equal to several hundred nanoseconds at pressures of interest.

As a system feature, in bulk pulsed laser gas systems, gas flow for thermal management plus heat exchanger required. In low to moderate power CW or quasi CW laser applications diffusion cooling with limited flow or no flow dependent on operational mode. In high power CW laser applications slab waveguide geometry with transverse flow and heat exchanger.

In molecules possessed of permanent dipole moments, the collisional rotational relaxation process may transition to limited far infra red (FIR) rotational-rotational amplified spontaneous emission (ASE) if adequately pumped and system configuration is supportive. This would have direct consequences in terms of quantum efficiency and limited thermal shedding in gas component of system.

As a system feature, passive selection of lasing within atmospheric windows in optically pumped gas component cell/cavity [FIG. 2, D; FIG. 3, D] is imposed by the presence of intracavity low gain elements (or sub cells—low gain denotes spectrally selective absorption) comprised of for example $^{12}CO_2 + ^{13}CO_2$ at several hundred Torr each in an atomic or homonuclear molecular buffer gas of several atmospheres. Sub cells arranged so as to not be subjected to near approximately 2 μm pump as $CO_2$ is possessed of an optical transition in this spectral region—or precisely matching pump transitions are excluded. The precise component gas partial pressures and net pressure to be adjusted as required in practice. Other absorbing molecular species to be implemented if advantageous.

The efficient channeling of system optical output into critical infrared atmospheric windows, plus the natural capability for this output to be broadly multispectral and thus tunable therein, renders this invention ideal for disruption of infra red imaging and tracking systems. Similarly the spectral agility enabled ability to channel efficient lasing into a near single frequency optical output cascade renders this approach promising for legitimately eye safe wavelength directed energy applications. Medical laser and remote sensing applications are additionally valid given the spectral bands accessible.

The forgoing description of the invention has been presented for purposes of illustration and description and is not intended to be exhaustive or to limit the invention to the precise form disclosed. Many modifications and variations are possible in the light of the above teaching. The embodiments disclosed were meant only to explain the principles of the invention and its practical application to thereby enable others skilled in the art to best use the invention in various embodiments and with various modifications suited to the particular use contemplated.

What is claimed is:

1. An optically pumped molecular laser system comprised of a principle overtone, or principle and multiple excited state overtones, or multiple principle overtones, or multiple principle and multiple excited state overtone pumps of suitable gases, optical pumps being pulsed, CW or quasi CW and derived from solid state Thulium doped laser systems to induce in gas a full to ground sustained lasing cascade with gas mix biased in favor of a hot chemical reaction for atomic H or D scavenging and thus lasing energy recovery from dissociation products and closed cycle gas function.

2. An optically pumped molecular laser system according to claim 1, wherein a spectrally discrete pump transitions are selected with due consideration to a solid state pump mediums mode repulsion range and an interaction bandwidth required to ensure efficient solid state system function.

3. An optically pumped molecular laser system according to claim 1, wherein a gas hybrid component consists of selected mixes comprising one or more of the gases (HCl, DF, HBr, He, Argon, $Br_2$, $F_2$, $Cl_2$, $H_2$, $D_2$) in appropriate combination for a desired operation and configured for closed cycle functioning and limited chemical reaction recovery from pump driven dissociation.

4. An optically pumped molecular laser system according to claim 1, wherein a laser diode excited solid state pump system is comprised of one or more laser diode pumped solid state master oscillators, tuned and locked onto desired gas overtone transition(s), out of molecular ground or excited levels, mutually temporally synchronized when pulsed and combined into a common optical axis by spectral beam combination or any other suitable technique.

5. An optically pumped molecular laser system according to claim 1, wherein a solid state system seed input is introduced as a common optical axis multispectral beam into a laser diode pumped solid state amplifier to generate output pump powers, and thus in gas, for temporal event durations consistent with an objective of driving the gas into a saturation condition consistent with onset and maintenance of a full to ground return sustained fundamental transition lasing cascade.

6. An optically pumped molecular laser system according to claim 1, wherein an optical output of a solid state amplifier is introduced into a gas component resonant cavity by means of spectral beam combiner, dichroic optics or any other suitable means consistent with a pump criteria for maintenance of a sustained full to ground return fundamental transition lasing cascade.

7. An optically pumped molecular laser system according to claim 1, wherein intra gas component cavity low gain cell(s), of at least $^{12}CO_2 + ^{13}CO_2$ at several hundred Torr each in an atomic or homonuclear molecular buffer gas of several atmospheres, will channel lasing into atmospheric windows with efficiency as required.

8. An optically pumped molecular laser system according to claim 1, wherein intra gas component cavity low gain cell(s) are arranged so as to not be subjected to a near approximately 2 μm pump as $CO_2$ is possessed of an optical transition in a spectral region—or precisely matching pump transitions are excluded, and precise partial pressures and net pressure utilized to be adjusted as required in practice.

9. An optically pumped molecular laser system according to claim 1, wherein with optically pumped heteronuclear hydrogen or deuterium halides of permanent dipole moment a capacity, adequately pumped, gas mix configured and systemically supported by path length and feedback to admit FIR (far infra red) lasing from rotational manifold relaxations during a full to ground fundamental cascade lasing event exists; and such additional photonic emission, out coupled, would reduce gas thermal loading.

10. An optically pumped molecular laser system according to claim 1, wherein a gas component may alternatively function with a resonant transfer acceptor species $CO_2$ in a donor environment of HBr, HCl or DF.

11. An optically pumped molecular laser system according to claim 1, wherein a gas component of a resonant transfer acceptor $CO_2$ arrangement consists of selected mixes comprising one or more of gases (HCl, DF, HBr, He, Argon, $Br_2$, $F_2$, $Cl_2$, $N_2$, $H_2$, $D_2$, $CO_2$) in appropriate combination for a desired operation and configured for closed cycle functioning and limited chemical reaction recovery from pump driven dissociation of hydrogen halide components as required.

12. An optically pumped molecular laser system according to claim 1, wherein a gas component of a resonant transfer acceptor $CO_2$ arrangement, when appropriately configured and pumped, admits lasing on both donor and acceptor species transitions—or preferentially on acceptor species transitions only.

13. An optically pumped molecular laser system according to claim 1, wherein intra gas component cavity low gain cell(s), of a combination of any suitable molecular species with appropriate spectral absorption structures at requisite partial pressures and admixed with atomic or molecular buffer gas/es of several atmospheres, will channel lasing into atmospheric windows with efficiency if required.

* * * * *